3,312,673
ETHYLENICALLY UNSATURATED CARBAZOLE POLYMERIC MATERIALS AND METHODS OF MAKING THE SAME
William A. Hewett, Saratoga, Calif., assignor to International Business Machines Corporation, New York, N.Y., a corporation of New York
No Drawing. Filed Aug. 26, 1963, Ser. No. 304,697
20 Claims. (Cl. 260—80.3)

The present invention generally relates to polymeric materials and more particularly relates to a new class of polymers and methods of making the same.

Polymers comprise giant molecules, each of which has been formed by the union of a considerable number of simple molecules, or monomers, with one another. The monomeric units in the polymer may vary from two to a thousand or more. Homopolymers are those polymers which are formed from monomers, all of which are substantially identical. Copolymers are polymers which are formed from two or more different types of monomers. As an example, SBR synthetic rubber is a copolymer formed from the monomers styrene and butadiene.

Polymers have also been classified according to whether or not they have a definite spatial arrangement of components, i.e., whether or not there are fixed positions in three-dimensional space for the various atoms and various parts of the polymeric molecular chain with respect to one another. Polymers which have a definite and repeating spatial arrangement are known as stereospecific polymers, while those the components of which have only a random or varying spatial arrangement with respect to one another are known as nonstereospecific polymers. Among the types of stereospecific polymers are isotactic and syndiotactic. Nonstereospecific polymers are designated atactic polymers.

The isotactic arrangement is one in which if the macromolecule could be stretched out in a two dimensional plane the substituent atoms or groups of atoms would be arranged, in the idealized form, so that they would be either above or below or on the same side of the main or backbone chain of the molecule. The syndiotactic arrangement is such that, if the macromolecule were stretched out in a two dimensional plane, some of the substituent groups would be, in the idealized form, above the plane in the backbone chain and the remainder below, but in a definite symmetrical and repeating pattern. An atactic arrangement is one where there is no definite symmetrical pattern or relationship with respect to the substituent groups above and below the backbone chain, if the chain were to be stretched out in a two dimensional plane.

There are a wide variety of polymers. Those, such as polyethylene, polyvinyl chloride, polyvinylidene chloride, polyurethane, urea-formaldehyde, are extensively used in a wide variety of applications, including synthetic fibers, heat and electrical insulating components, coating materials, binding materials, and structural materials, such as glass substitutes, ceramic substitutes, wood and metal substitutes and the like. Generally, the higher the molecular weight of the polymer the more viscous, solid and inelastic the polymer. Accordingly, even one type of polymer containing a single type of monomer varies widely in physical characteristics, depending on its molecular weight, i.e., monomeric unit multiplication. In view of the wide current use and the extensive potential application of polymeric substances, it would be desirable to provide new types of polymers from readily and controllably polymerizable substances. Such substances should preferably include various reactive groups capable of accepting or exchanging a wide variety of substituents, for suitable modification of the chemical and physical nature of the polymers.

Accordingly, it is the principal object of the present invention to provide new polymers. It is also an object of the present invention to provide methods of making such polymers.

It is a further object of the present invention to provide a new class of reactive polymers and methods of making the same.

These, and other objects, are accomplished in accordance with the present invention, by providing a new class of polymers which comprise poly 9-alkenyl carbazoles of selected type, which polymers can be made in an efficient, effective manner to a controlled degree of polymerization in accordance with the present method. The finished polymers are useful for a number of purposes, for example as insulation, synthetic fibers, binders, coatings, and the like, and are also capable of reacting with selected sensitizers to provide new polymeric-containing products such as improved photoconductors.

As a specific example of one aspect of the present invention, 9(4-pentenyl) carbazole having the structural formula

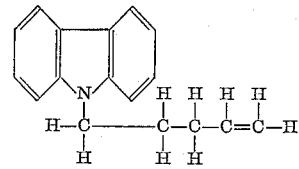

was polymerized to a monomeric unit multiplication of 500 by contacting it in benzene at 50° C. with a Ziegler catalyst comprising diethyl aluminum chloride and titanium trichloride (mole ratio of 2:1), with the weight ratio of substituted carbazole to catalyst being 100:1. The product, poly 9(4-pentenyl) carbazole, was then sensitized with 2,5-diphenyl quinone (in 3% by weight concentration), and thereafter coated while in the viscous state on an aluminum base plate. In the sensitizing reaction, the aromatic units of the polymer complexed with the molecules of the sensitizer and resulted in a product which exhibited a sudden increase in electrical conductivity upon exposure to light in the visible region (blue) of the photospectrum. Thus, the resulting film on the aluminum plate was charged in the dark, after drying, with a corona unit to 280 volts. Upon exposure of the film to visible light radiation from a high presure mercury arc lamp, the film discharged 140 volts in 6 milliseconds, that is, half of its original voltage. Accordingly, the film was an effective and improved photoconductor, acting as a variable resistor photosensitive to visible light. The improved photoconductor was suitable for use in a variety of electrical applications.

The foregoing and other objects, features and advantages of the invention will be apparent from the following more particular description of preferred embodiments of the invention.

The polymers of the present invention are prepared from monomers having the following structural formula:

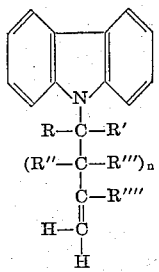

Where $n=1-20$ and R, R', R'', R''' and R'''' are substituents selected from the group consisting of hydrogen, alkyl, aryl and alkylaryl substituents.

Such polymers have the following structural formula:

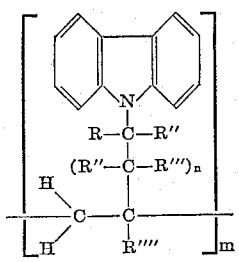

Where $n=1-20$, $m$ is the number average monomeric unit multiplication and is equal to 10–1,000, and where R, R', R'', R''', and R'''' are substituents selected from the group consisting of hydrogen, alkyl, aryl and alkylaryl substituents. It will be understood that within a given amount of the polymeric product, a distribution of individual polymers is present having monomeric unit multiplications which can vary from a low number to a relatively high number. It will be noted from the above formulas that the monomeric multiplication takes place through the terminal double bonds of the alkenyl substituents.

Monomers from which the polymers of the invention can be prepared and having the previously indicated structural formula, but where $n=2-20$ can be prepared by a method set forth in detail in co-pending U.S. patent application, Ser. No. 304,688, filed Aug. 26, 1963, now Patent No. 3,252,993, for Organic Compounds and Method of Making Same, of which the present inventor, W. A. Hewett, is also the inventor, said application having been assigned to the assignee of the present application. As set forth in that co-pending application, selected monomers containing alkenyl substituents, the carbon chain lengths of which are 5–23 carbon atoms can be prepared from carbazole by first reacting the carbazole with an alkali metal compound, preferably a hydride selected from the group consisting of lithium, sodium, and potassium hydride, in the presence of a suitable reaction medium and under anhydrous, non-oxidizing conditions. For example, anhydrous carbazole in anhydrous tetrahydrofuran has been reacted under a nitrogen blanket with anhydrous sodium hydride in anhydrous tetrahydrofuran at room temperature to form 9-sodium carbazole. The alkali metal substituted carbazole has the following general structural formula:

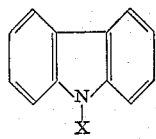

Where X is selected from the group consisting of sodium, potassium and lithium.

The 9-alkali metal carbazole is then reacted under anhydrous non-oxidizing conditions with a monohalogenated alkene having the following structural formula:

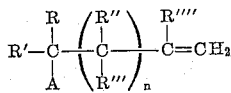

(Where $n=2-20$, where A is selected from the group consisting of chlorine, bromine and iodine, and where R, R', R'', R''' and R'''' are selected from the group consisting of hydrogen, alkyl, aryl and alkylaryl substituents) for example, anhydrous 5-bromopentene in anhydrous tetrahydrofuran under suitable reaction conditions, for example, about 70° C., to provide the desired 9-alkenyl-substituted carbazole monomer, for example 9(4-pentenyl) carbazole having the following structural formula:

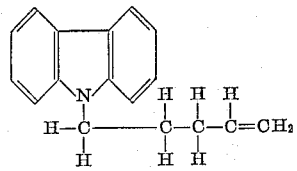

In the case of 9-alkenyl substituted carbazoles wherein $n=1$, a different route of preparation is necessary in order to avoid the formation of butadiene-type products, rather than the desired 9(3-butenyl) carbazoles. One suitable method of preparation is that which is set forth with particular reference to 9(3-butenyl) carbazole in co-pending United States patent application, Ser. No. 304,696, filed on Aug. 26, 1963, now Patent No. 3,268,-550, for Organic Compounds and Method of Making Same, of which Jorge Heller is the inventor, which application is assigned to the assignee of the present application. According to that application, 9(3-butenyl) carbazole is prepared by first reacting alkali metal substituted carbazole, as previously described, with a 1,4-dihalogenated butene. The halogens of the butene can be chlorine, bromine or iodine or any two of those three.

The substitution reaction is carried out under anhydrous, non-oxidizing conditions to prepare a monohalogenated butyl substituted carbazole, such as 9(4-chlorobutyl) carbazole or 9(4-bromobutyl) carbazole. Thus, for example, anhydrous sodium carbazole in anhydrous tetrahydrofuran can be reacted under a nitrogen blanket with anhydrous 1,4-dichlorobutane in anhydrous tetrahydrofuran at 70° C. over an 18 hour period, with stirring, to prepare 9(4-chlorobutyl) carbazole.

This product is then condensed, preferably using a metal alkoxide, such as potassium tertiary butoxide, and refluxing conditions under anhydrous non-oxidizing conditions, to the desired 9(3-butenyl) carbazole. For example, anhydrous 9(4-chlorobutyl) carbazole has been condensed under a nitrogen blanket at refluxing temperature while in anhydrous tertiary butyl alcohol with potassium, to 9(3-butenyl) carbazole. This method is equally applicable to 9(3-butenyl) carbazole carrying alkyl and/or aryl and/or alkylaryl substituents on the butenyl chain, in accordance with the preceding formula.

Other methods of preparation of the 9(3-butenyl) carbazoles are also possible.

The selected 9-alkenyl substituted carbazole monomer, prepared in accordance with the foregoing, is polymerized through the double bond thereof, in accordance with the method of the present invention. Depending on the constituents of the polymerizable material, a homopolymer or a copolymer can be formed. Thus, a single type of the above-described 9-alkenyl substituted carbazoles can be polymerized to a homopolymer. Alternatively, two or more types of the above-described 9-alkenyl-substituted carbazoles can be copolymerized to a suitable copolymer. As an example, a copolymer comprising poly 9(4-pentenyl) carbazole and poly 9(5-hexenyl) carbazole in a parts ratio of 1–100:100–1 can be prepared by the present method. This product is suitable for a variety of purposes.

Block copolymers can also be formed. A block copolymer is a copolymer whose molecule is made up of comparatively long sections that are of two chemical types, sections of one type alternating along the chain with sections of the second type. Accordingly, blocks of one type of the above-described 9-alkenyl substituted carbazoles can alternate with blocks of another type of the above-described 9-alkenyl substituted carbazoles along the polymer chain, both of which types being within the definition of the described structural formula. In yet another polymerizing reaction, a 9-alkenyl-substituted carbazole within the definition of the described structural formula, can be reacted with another polymeric forming material such as pentene-1, or the like, to form a copolymer, which can, if desired, be a block copolymer. The molecules of the polymers formed in accordance with the method of the present invention can be in tactic or atactic form, depending upon particular polymerization conditions employed.

As described, in the method of the present invention, material containing 9-alkenyl-substituted carbazole monomer is polymerized in the presence of a suitable polymerizing catalyst and under suitable anhydrous, non-oxidizing polymerizing conditions to polymeric products containing the 9-alkenyl-substituted monomer or monomers as integral multiplication units in accordance with the above-set-forth structural formula. During the polymerizing reaction, the 9-alkenyl-substituted carbazole is preferably contacted with the catalyst and other reactants, if any, while dissolved or dispersed in a suitable medium, for example, an aromatic solvent such as benzene, toluene or a paraffinic solvent such as hexane. The polymerizing temperature may be any suitable temperature, but usually is relatively low, for example, between about −170° C. and 100° C., and the polymerization catalyst may be any such suitable catalyst.

One type of promoter or catalyst of the polymerization reaction, which can be used in the method of the present invention, is a substance which provides a free radical for the polymerization reaction as, for example, the radicals formed upon the decomposition of benzoyl peroxide. The polymerization effected is a typical chain addition reaction. Apparently, the growing polymer chain is formed by consecutive addition of monomeric units.

The chain reaction in the free radical-type of catalyzed polymerization reaction proceeds by the stages of initiation, propagation and termination. The initiation involves the reaction of a free radical with a monomer to obtain a new radical, which grows by successive addition of monomer units. At intermediate stages during such polymerization, the monomer is still usually present, together with polymers comparable in size to those present in the final stages. The chain is terminated when two chain radicals react with each other. Alternatively, the polymerization can be terminated by disproportionation or by the use of a chain transfer reagent such as a mercaptan. Apparently, the initiator, that is the free radical, is actually incorporated into the polymer. In the case of disproportionation, one of two free radical-containing polymers acquires a hydrogen atom from another free radical-containing polymer, so as to reach the saturated state, i.e., a non-free radical-containing state, whereas the donor of the hydrogen atom acquires a double bond and, accordingly, also is satisfied and reaches a non-free radical-containing state, thus terminating the reaction.

A second type of catalyst comprises the Friedel-Crafts type catalyst such as aluminum chloride, boron fluoride, stannic chloride, and the like. In such instances, the polymerization is initiated by a formation of a carbonium ion, usually by the transfer of a protron; propagation then proceeds as in the peroxide-induced polymerization reactions of the free radical type, only in this case you have a growing carbonium ion, and terminates by loss of a proton, with the production of an unsaturated terminal unit.

The polymerization reaction can also proceed utilizing other types of catalysts, promotors, and/or initiators. Thus, for example, a Ziegler-Natta type polymerization reaction can take place, in which a Zeigler-Natta catalyst is used. Such a catalyst is a chemical complex derived from a transition metal halide from Group IV to Group VIII of the periodic table and a metal hydride or metal alkyl of a metal from Group I to Group III of the periodic table. A typical example of a Ziegler catalyst is a complex of titanium trichloride and diethyl aluminum chloride. Such catalysts cause stereospecific polymerization at atmospheric pressure and at relatively low temperature. For example, diethyl aluminum chloride can be used in admixture with titanium trichloride, in a mole ratio to each other of 25:1 in the present polymerization method. The 9-alkenyl-substituted carbazole monomer may be present in any suitable concentration with respect to the catalyst, for example of about 10–200:1–3.

The polymerization reaction is terminated when the product has the desired physical and chemical characteristics. The product is then recovered, and purified, if desired.

The following examples further illustrate certain features of the present invention.

*Example I*

Poly 9(4-pentenyl) carbazole having a monomeric unit multiplication number of about 200 is prepared in accordance with the following procedure:

Approximately 8.5 gm. of alkali metal carbazole, namely, sodium carbazole, in 120 ml. of anhydrous tetrahydrofuran, previously prepared by reacting under anhydrous conditions and under a nitrogen blanket about 8.4 gm. of carbazole in the same solvent with about 1.3 gm. of sodium hydride at 35° C. for 1.5 hours, is reacted at refluxing temperature under anhydrous conditions and under a nitrogen blanket with 9 gm. of the monohalogenated alkene, 5-bromo pentene-1 in 20 ml. of anhydrous tetrahydrofuran for 20 hours under agitation to provide 6 gm. of 9(4-pentenyl) carbazole. About 4.7 gm. of this product, upon separation from the solvent (reaction medium) and unreacted constituents, is disposed in 40 ml. of benzene solvent which also contains 2 millimoles of titanium trichloride and 5 millimoles of ethyl aluminum chloride. The temperature of the reactants is maintained at 50° C. for 72 hours under non-oxidizing anhydrous conditions, until the monomeric multiplication is approximately 200. About 2.5 gm. of polymer are obtained. Thereupon, the so-produced polymer is separated from the catalyst and reaction medium by the following procedure: The product is added to a mixture of 20 ml. of HCl in methanol (10% of volume of the product) and is stirred 5 minutes, after which the product is poured into a large volume of methanol and filtered. The purified product is examined by X-ray and determined to be a crystalline polymer in tactic form having the following approximate characteristics: intrinsic viscosity=0.40; appearance= white powder; other characteristics, softening point=170° C.; 95% insoluble in boiling acetone; 95% insoluble in boiling heptane. This polymer is useful in the production of electrical insulation and in the preparation of synthetic fibers for fibrous products and the like.

Moreover, the polymer is convertible to to an improved photoconductor by reacting the aromatic nucleus thereof with effective concentration of a sensitizer such as iodine, so that the product exhibits a sudden change in electrical conductivity upon exposure to visible and/or ultraviolet light.

Example II

Poly 9(5-hexenyl) carbazole having a monomeric unit multiplication number of about 200 is prepared in accordance with the following procedure:

Approximately 55 gm. of alkali metal carbazole, namely, 9-sodium carbazole, in 800 ml. of anhydrous tetrahydrofuran, previously prepared by reacting about 55 gm. of anhydrous carbazole in the same solvent with about 9 gm. of anhydrous sodium hydride at 25° C. for 3 hours under anhydrous conditions and under a nitrogen blanket, is reacted at about 70° C. under anhydrous conditions and under a nitrogen blanket with 65 gm. of the monohalogenated alkene, 6-bromo-1-hexene disposed in 100 ml. of anhydrous tetrahydrofuran for 20 hours under agitation to provide 36 gm. of 9(5-hexenyl) carbazole. About 5 gm. of this product, upon separation from the solvent (reaction medium) and unreacted constituents, is disposed in 40 ml. of benzene solvent which also contains 2 millimoles of titanium trichloride and 5 millimoles of ethyl aluminum chloride polymerization catalyst. The temperature of the reactants is maintained at 70° C. for 72 hours under non-oxidizing anhydrous conditions, until the monomeric multiplication is approximately 200. About 2.6 gm. of polymeric product is obtained. Thereupon, the so-produced polymer is separated from the catalyst and reaction medium by the procedure as set forth in Example I.

The product is examined by X-ray and determined to be a crystalline polymer in tactic form having the following approximate characteristics: viscosity=0.46; appearance=white powder; softening point=180° C.; 91% insoluble in acetone and heptane. This polymer is useful in the production of electrical insulation and the like.

Moreover, the polymer is convertible to a photoconductor by reacting the aromatic nucleus thereof with selected sensitizer, for example, iodine, so that the product has increased sensitivity to light in the visible and/or near ultraviolet portions of the photospectrum.

Example III

Poly 9(4-pentenyl)-9(5-hexenyl) carbazole (a copolymer) is prepared in accordance with the following procedure.

The monomers, 9(4-pentenyl) carbazole and 9(5-hexenyl) carbazole, are prepared in accordance with the procedures set forth in Examples I and II, respectively. Thereupon, a mixture of about 2.35 gm. of the 9(4-pentenyl) carbazole and 2.5 gm. of the 9(5-hexenyl) carbazole is disposed in 30 ml. of benzene which also contains 2 millimoles of titanium trichloride and 5 millimoles of ethyl aluminum chloride polymerization catalyst. The temperature of the reactants is maintained at 50° C. for 72 hours under anhydrous non-oxidizing conditions, until the monomeric multiplication is approximately 180. A yield of about 2.9 gm. of polymer is obtained. Thereupon, the so-produced polymer is separated from the catalyst and reaction medium by the procedure set forth in Example I. Such product has the following characteristics: appearance=white powder; softening point=160° C.; extremely insoluble. This polymer is useful in the production of synthetic products, electrical insulation, and improved photoconductors, among other things.

Thus, the copolymer is convertible to a photoconductor by reacting the aromatic nuclei thereof with selected photosensitizer to provide the product with increased sensitivity to light in the visible and/or near ultraviolet portions of the photospectrum.

Example IV

Poly 9(4-pentenyl) carbazole having a monomeric unit multiplication number of about 10 is prepared in accordance with the following procedure:

The monomer, 9(4-pentenyl) carbazole is prepared according to the procedure set forth in Example I.

This product, in about 5 gm. amount, is disposed in 50 ml. of benzene solvent which also contained 1% benzoyl peroxide polymerization catalyst. The temperature of the reactant is maintained at 70° C. for 24 hours under anhydrous non-oxidizing conditions, until the monomeric unit multiplication is approximately 10. A yield of about 3.5 gm. of product is obtained. Thereupon, the so-produced polymer is separated from the catalyst and reaction medium by repeatedly washing it with large volumes of ethyl alcohol. The monomer is soluble therein but the polymer is insoluble therein.

The product is examined by X-ray and determined to be an amorphous polymer in atactic form having an intrinsic viscosity=about 0.03. This polymer is useful for the same purposes as specified in Examples I, II and III.

Example V

Poly 9(22-tricosenyl) carbazole having a monomeric unit multiplication number of about 100 is prepared in accordance with the following procedure:

Approximately 8.5 gm. of 9-alkali metal carbazole, namely, 9-sodium carbazole, in 120 ml. of anhydrous tetrahydrofuran, previously prepared by reacting under anhydrous non-oxidizing conditions about 8.4 gm. of carbazole in the same solvent with about 1.3 gm. of sodium hydride at 23° C. for 1.5 hours, is reacted under anhydrous non-oxidizing conditions at about 70° C. with 24 gm. of the monohalogenated alkene, 23-bromo-1-tricosene disposed in 40 ml. of anhydrous tetrahydrofuran for 20 hours under agitation to provide 10 gm. of 9(22-tricosenyl) carbazole. This product in 10 gm. amount is disposed in 80 ml. of benzene which also contains 2 millimoles of titanium trichloride and 5 millimoles of ethyl aluminum chloride polymerization catalyst. The temperature of the reactants is maintained at 70° C. for 72 hours under anhydrous, non-oxidizing conditions, until the monomeric multiplication is approximately 100. About 6 gm. of polymer is produced. Thereupon, the so-produced polymer is separated from the catalyst and reaction medium by a procedure as previously described in Examples I and II. The product is identifiable as poly 9(22-tricosenyl) carbazole and is useful as previously described for the polymers of Examples I to IV.

Example VI

Poly 9(10-phenyl-10-undecenyl) carbazole having a monomeric unit multiplication number of about 12 is prepared in accordance with the following procedure:

Approximately 8.5 gm. of alkali metal carbazole, namely, 9-sodium carbazole, in 120 ml. of anhydrous tetrahydrofuran, previously prepared by reacting under anhydrous, non-oxidizing conditions about 8.4 gm. of carbazole in the same solvent with about 1.3 gm. of sodium hydride at 23° C. for 1.5 hours, under anhydrous, non-oxidizing conditions, is reacted at about 70° C. with 18.5 gm. of the monohalogenated alkene, 2-phenyl-11-bromoundecene-1 disposed in 60 ml. of tetrahydrofuran for 20 hours under agitation to provide 12 gm. of 9(10-phenyl-10 undecenyl) carbazole. This product, in about 5 gm. amount, is disposed in 60 ml. of methylene chloride which also contains 0.2 gm. of boron trifluoride etherate polymerization catalyst. The temperature of the reactants is maintained at −78° C. for 6 hours under anhydrous, non-oxidizing conditions, until the monomeric multiplication is approximately 12. Thereupon, the polymerization is stopped by the addition of the reagent ammonium hydroxide to the reaction mixture. The so-produced polymer is then separated from the catalyst, monomer and reaction medium by repeatedly washing it with methanol, i.e. until it is neutral in pH. The polymer is then filtered and dried. The purified polymer is chemically identifiable as poly 9(10-phenyl-10-undecenyl) carbazole, which polymer is suitable for use as a component of an improved photoconductor, as electrical insulating material and for other purposes.

Example VII

Poly 9(4-pentenyl) carbazole having a monomeric unit multiplication number of about 100 is prepared in accordance with the following procedure:

The monomer is prepared by the method set forth in Example I. About 5 gm. of this product, is then disposed in 50 ml. of n-heptane which also contains 2 millimoles of titanium trichloride, 5 millimoles of ethyl aluminum chloride and 0.05 millimoles of zinc diethyl polymerization catalyst. The temperature of the reactants is maintained at 50° C. for 72 hours under anhydrous, non-oxidizing conditions, until the monomeric multiplication is approximately 100. A yield of about 2.5 gm. of polymer is obtained. Thereupon, the so-produced polymer is separated from the catalyst, monomer, and reaction medium by the same procedure as set forth in Example I.

The product is examined by X-ray and determined to be a crystalline polymer in tactic form having the following approximate characteristc: intrinsic viscosity=0.2; apperance=white powder, highly insoluble in usual organic solvents. This polymer is useful for the purposes generally set forth in Example I.

Example VIII

Poly 9(4-pentenyl) carbazole having a monomeric unit multiplication number of about 70 is prepared in accordance with the procedure of Example VII, utilizing the same constituents and concentrations, etc., except that no zinc diethyl is present and, instead, 20 ml. (standard pressure) of hydrogen is present, the reaction being carried out in an autoclave. The temperature of the reactants is maintained at 70° C. for 24 hours under anhydrous, non-oxidizing conditions, until the monomeric multiplication is approximately 70. A yield of about 2 gm. of polymer is obtained. The purified polymer has an intrinsic viscosity of 0.15.

Example IX

A copolymer of poly 9(4-pentenyl) carbazole and poly 1-pentene is prepared in the following manner:

The 9(4-pentenyl) carbazole monomer is prepared by the method set forth in Example I. The 1-pentene is commercially available. A mixture of 2.5 gm. f the 9(4-pentenyl) carbazole and 2.0 gm. of the 1-pentene is made and disposed in 30 ml. of benzene and reacted according to the procedure set forth in Example III, including the same concentrations of the same catalyst, the same time and temperature. The product is obtained in a yield of about 2.8 gm. and is purified in the manner set forth in Example III. Such product has a monomeric unit multiplication of 150 and comprises a copolymer of poly 9(4-pentenyl) carbazole and poly 1-pentene. It is suitable for use in electrical insulation and for a variety of other purposes.

The preceding examples clearly illustrate that a new class of polymers, which can be homopolymers, copolymers, block copolymers, and the like can be prepared in accordance with the method of the present invention, utilizing 9-alkenyl-substituted carbazoles of selected types, as indicated in the foregoing. Moreover, the polymers, depending upon polymerization conditions, can be prepared in tactic or atactic form. In addition, the physical characteristics of the polymers can vary, depending upon the particular monomers used, the extent of monomeric multiplication and the arrangement of the monomeric units within the polymeric chain.

The preceding examples also clearly set forth that the desired polymerization reactions can be carried out utilizing a variety of reaction times, temperatures, reaction media and catalysts. Some of the actual and potential uses of particular polymerized 9-alkenyl-substituted carbazoles are set forth in the preceding examples. However, various other uses have been found for the polymers, again depending on their physical and chemical characteristics.

The present method of preparation is simple and rapid, and provides the desired polymeric products in high yield. The physical characteristics of such products can be easily controlled by the selection of the particular reactants and reaction parameters, such as control of molecular weight under Ziegler-Natta polymerization conditions through the use of hydrogen and zinc diethyl or the like. Other advantages are set forth in the foregoing.

While the invention has been particularly described with reference to preferred embodiments thereof, it will be understood by those skilled in the art that variations in form may be made therein without departing from the spirit and scope of the invention.

What is claimed is:

1. A new solid polymer consisting of monomeric units having the structural formula:

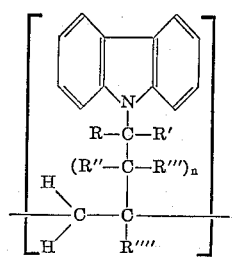

wherein $n=1-20$, and wherein R, R', R'', R''' and R'''' are substituents selected from the group consisting of hydrogen, phenyl, and lower alkyl substituents.

2. A new solid polymer consisting of the structural formula:

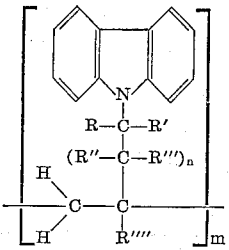

wherein R, R', R'', R''' and R'''' are substituents selected from the group consisting of hydrogen, phenyl, and lower alkyl substituents, wherein $n=1-20$ and wherein the number average monomeric unit multiplication, $m=10-1000$.

3. The polymer of claim 2 in a tactic form.
4. The polymer of claim 2 in an atactic form.
5. A new solid copolymer consisting of the structural formula:

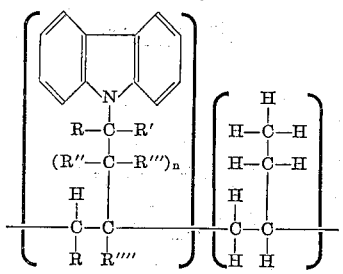

where $n=1-20$, and R, R', R'', R''' and R'''' are substituents selected from the group consisting of hydrogen, lower alkyl, and phenyl substituents.

6. The new copolymer of claim 5 in tactic form.
7. The new copolymer of claim 5 in atactic form.
8. The new copolymer of claim 5 wherein each of the monomeric units thereof has said structural formula and wherein the monomeric unit multiplication is 10–1000.

9. Solid poly-9(4-pentenyl) carbazole consisting of the structural formula:

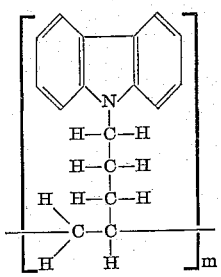

wherein $m=10-1000$.

10. Solid poly-9(5-hexenyl) carbazole consisting of the structural formula

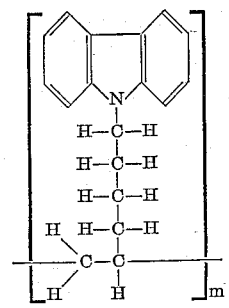

wherein $m=10-1000$.

11. A new solid copolymer consisting poly 9(5-hexenyl) carbazole and poly 9(4-pentenyl) carbazole which has the structural formula

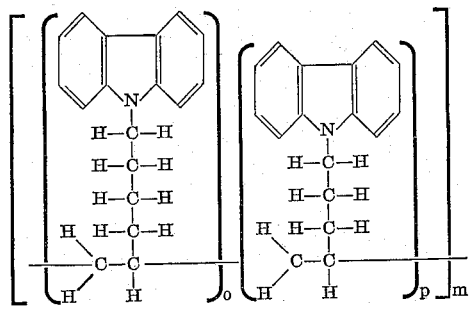

wherein $m=10-1000$ and wherein the ratio of O to P is equal to $1-100:100-1$.

12. The method of making a new solid 9-alkenyl substituted carbazole-containing polymer, which method comprises polymerizing to a number average monomeric unit multiplication of about 10-1000 material which includes a polymer-forming 9-alkenyl-substituted carbazole having the structural formula

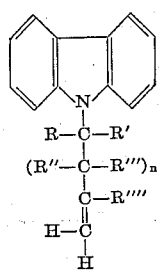

wherein $n=1-20$ and wherein R, R', R'', R''' and R'''' are substituents selected from the group consisting of hydrogen, lower alkyl, and phenyl substituents, said polymerization reaction being effected at a temperature between about $-170°$ C. and $100°$ C. and in a suitable reaction medium and in the presence of a Ziegler polymerization catalyst, terminating said polymerization reaction and separately recovering the desired polymeric product.

13. The method of making a new solid 9-alkenyl-substituted carbazole polymer, which method comprises polymerizing through the double bonds thereof and to a number average monomeric unit multiplication of about 10-1000 polymer-forming 9-alkenyl-substituted carbazole having the structural formula

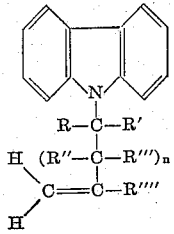

wherein $n=1-20$ and wherein R, R', R'', R''' and R'''' are substituents selected from the group consisting of hydrogen, lower alkyl, and phenyl substituents, said polymerization reaction being effected at a temperature between about $-170°$ C. and $100°$ C. and in a suitable reaction medium and in the presence of a Ziegler polymerization catalyst under non-oxidizing, anhydrous conditions, terminating said polymerization reaction and separately recovering the polymeric product from unreacted ingredients, said reaction medium and remaining polymerizing catalyst.

14. The method of making a new solid 9-alkenyl-substituted carbazole-containing copolymer, which method comprises polymerizing to a number average monomeric unit multiplication of about 10-1000 polymer-forming material to a product which includes at least one 9-alkenyl-substituted carbazole monomeric unit having the structural formula

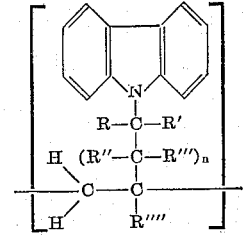

wherein $n=1-20$ and wherein R, R', R'', R''' and R'''' are substituents selected form the group consisting of hydrogen, lower alkyl, and phenyl substituents, said polymerization reaction being effected at a temperature between about $-170°$ C. and $100°$ C. and in a suitable reaction medium and in the presence of a Ziegler polymerization catalyst under anhydrous, non-oxidizing conditions, terminating said polymerization reaction and recovering the polymeric product from unreacted ingredients, said reaction medium and remaining polymerizing catalyst.

15. The method of claim 14 wherein each of the monomeric units of said polymer have said structural formula.

16. The method of making solid 9(4-pentenyl) carbazole polymer, which method comprises polymerizing through the double bond thereof pentenyl carbazole having the structural formula

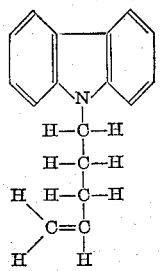

said reaction being effected at 0–70° C., in a solvent for said pentenyl carbazole and in the presence of a Ziegler polymerization catalyst comprising a complex of diethyl aluminum chloride and titanium trichloride under anhydrous, non-oxidizing conditions, terminating said polymerization reaction and recovering poly 9(4-pentenyl) carbazole from unreacted 9(4-pentenyl) carbazole, solvent therefor and Ziegler catalyst.

17. The method of making solid 9(5-hexenyl) carbazole polymer having a monomer unit multiplication of 10–1000, which method comprises polymerizing 9(5-hexenyl) carbazole having the structural formula

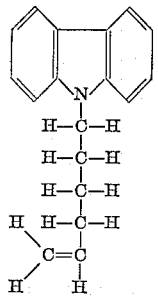

said polymerization reaction being effected in hydrocarbon solvent for said hexenyl carbazole, at 0–70° C. and in the presence of polymerization catalyst comprising diethyl aluminum chloride and titanium trichloride under anhydrous, non-oxidizing conditions, terminating said polymerization reaction when the monomeric unit multiplication is 10–1000, and recovering poly 9(5-hexenyl) carbazole from said solvent, unreacted monomer and said catalyst.

18. The method of making a solid copolymer 9(4-pentenyl) carbazole and 9(5-hexenyl) carbazole, said polymer having a monomer unit multiplication of 10–1000, which method comprises polymerizing a mixture of 9(4-pentenyl) carbazole and 9(5-hexenyl) carbazole in a parts ratio of 1–1000:100–1 in a mutual hydrocarbon solvent under non-oxidizing anhydrous conditions at about 0–70° C. and in the presence of polymerization catalyst comprising a complex of diethyl aluminum chloride and titanium trichloride, terminating said polymerization reaction when the monomeric unit multiplication is 10–1000 by controlled addition of hydrogen thereto, and separately recovering the resulting carbazole copolymer from said solvent, unreacted monomers and said catalyst.

19. The method of claim 12 wherein the temperature is between 0–70° C.

20. The method of claim 14 wherein the temperature is between 0–70° C.

References Cited by the Examiner
UNITED STATES PATENTS 3,024,225  3/1962  Teot _____ 260—88.3
3,252,993  5/1966  Hewett _____ 260—88.3

JOSEPH L. SCHOFER, *Primary Examiner.*

H. WONG, *Assistant Examiner.*